Nov. 6, 1945.    J. LUND    2,388,424
ONE—WAY ROTARY CLUTCH
Filed Sept. 20, 1943    2 Sheets-Sheet 1

INVENTOR.
JOHAN LUND
BY
Whittemore Hulbert & Belknap
ATTORNEYS

Nov. 6, 1945.   J. LUND   2,388,424
ONE-WAY ROTARY CLUTCH
Filed Sept. 20, 1943   2 Sheets-Sheet 2
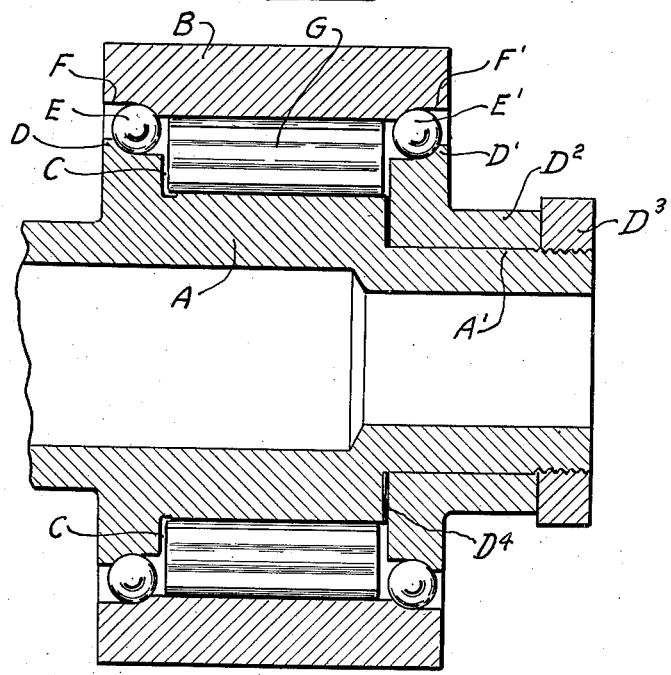
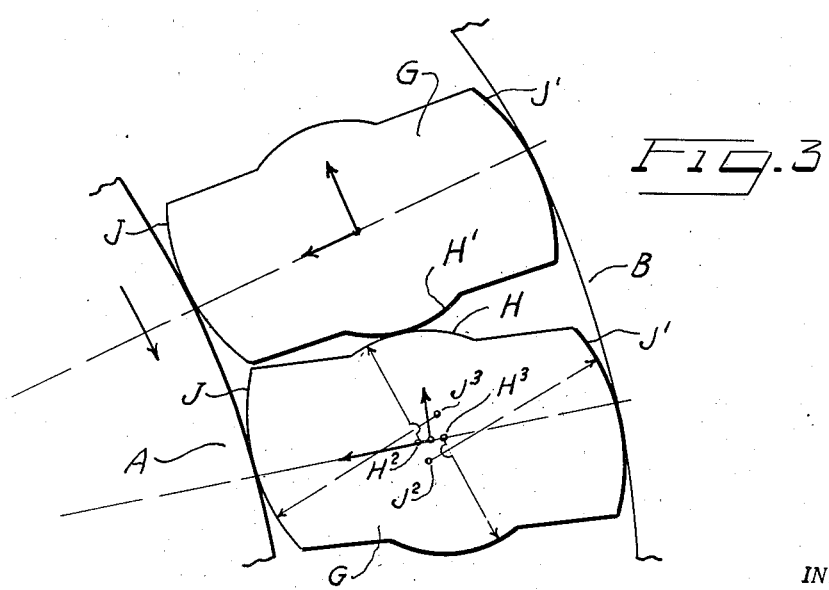
INVENTOR.
JOHAN LUND
BY
Whittemore Hulbert & Belknap
ATTORNEYS Patented Nov. 6, 1945

2,388,424

UNITED STATES PATENT OFFICE 2,388,424

ONE-WAY ROTARY CLUTCH

Johan Lund, Detroit, Mich., assignor to The Gear Grinding Machine Company, Hamtramck, Mich., a corporation of Michigan Application September 20, 1943, Serial No. 503,126

2 Claims. (Cl. 192—45.1)

The invention relates to rotary one-way clutches and has for its object the obtaining of a construction which will remain operative under various conditions. In particular, it is an object to obtain a construction in which the clutching elements are balanced with respect to centrifugal forces so that the latter will not interfere with proper functioning. To this end the invention consists in the construction as hereinafter set forth.

In the drawings:

Fig. 2 is a longitudinal section in an axial plane;

Fig. 3 is an enlarged diagram illustrating the operation of the clutching elements;

As illustrated, A is the inner member of the rotary clutch, and B a concentric outer member thereof. The inner member has an annular channel C therein and on opposite sides of this channel race portions D and D' for ball bearings E and E'. The outer member B is also provided with race portions F and F' cooperating with the balls E, E' and race portions D, D' to form an antifriction rotary bearing for the members A and B with respect to each other. The race portion D' is formed on a removable member $D^2$ which latter is sleeved upon a portion A' of the member A of reduced diameter. A nut $D^3$ clamps the member $D^2$ and shims $D^4$ provide adjustable running clearance for the ball bearings. Within the annular recess C is arranged an endless annular series of clutching elements G. Each of these elements is what might be termed a sprag which is normally inclined slightly to a radial line from the common axis of the members A and B and contacts with these members at its opposite ends. The angle of inclination is sufficiently small as to be within the angle of friction so that a torque in either member in one direction will effect an instantaneous locking while a torque in the opposite direction will permit free rotation on the ball bearings E and E'.

The members G are held in position by contact between the same and adjacent members of the series. These contacts are formed by arcuate portions H and H' on opposite sides of each member G, the centers of said arcs being respectively radially offset on opposite sides of the center of gravity of the member as indicated at $H^2$ and $H^3$. The offsetting is also such as to limit the angular movement of the sprag with respect to a radial line. In other words, an angular movement away from the radial line will cause a wedging of the arcuate faces of adjacent members against each other, and inasmuch as the series is endless, this forms an absolute limit to further movement in such direction. On the other hand, an angular movement of adjacent members G towards the radial line of each will relieve pressure of the arcuate bearings H and H' against each other so as to permit freedom of action of said members in response to friction upon opposite ends thereof. Thus, all of the members G will be held within the angle of friction and will cooperate with each other in locking and transmitting torque in one direction between the members A and B.

Figure 1:
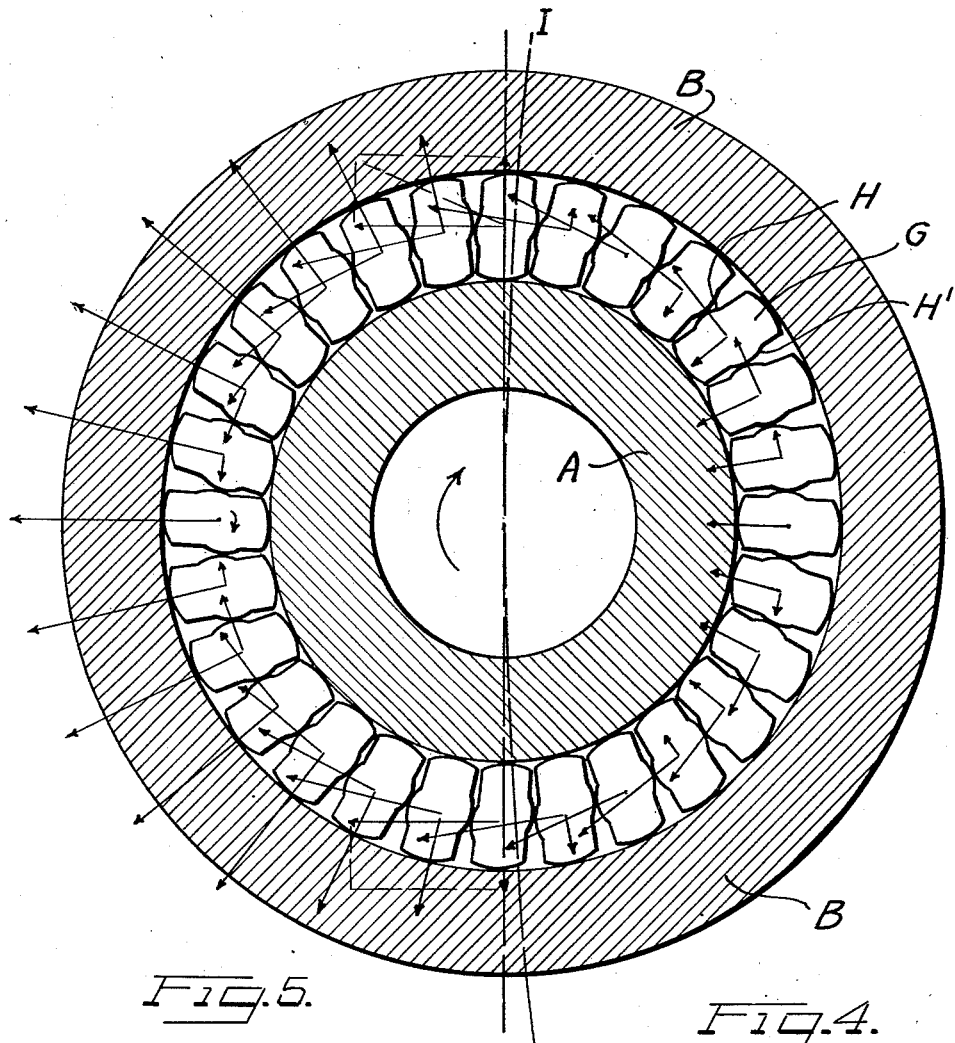
Fig. 1 is a central section through the clutch in the plane of rotation thereof.

To avoid disturbances by centrifugal forces, each of the members G is substantially symmetrical, with the distribution of mass therein substantially equal outside and inside of the bearing contacts in the arcuate surfaces H, H'. The centrifugal force of a sprag in relation to eccentric axis will also impose a force on an adjacent sprag through contacts H and H' and will cause said sprags to remain in the position with the smallest angle of inclination. This will hold the sprags in contact with the outer and inner members at all times and eliminates lost motion when the clutch engages. Consequently, if the clutch is located within a mechanism rotating about an eccentric axis, this will not affect its proper functioning. This is illustrated in Fig. 1 where the line I—I represents an arcuate path through which the clutch is traveling about an eccentric axis. The lines with arrows represent the distribution of forces due to centrifugal action.

By arranging the ball bearings E, E' on opposite sides of the sprag members I am enabled to use the whole of the annular space in the channel C for sprags, which in combination will transmit a maximum load. The opposite ends J and J' of each sprag are preferably arcuate but with their centers offset on opposite sides of the center line thereof as indicated at $J^2$ and $J^3$. This will provide working clearance for the free relative rotation of the members A and B when the sprag members are at their maximum angle of inclination.

Figure 5:
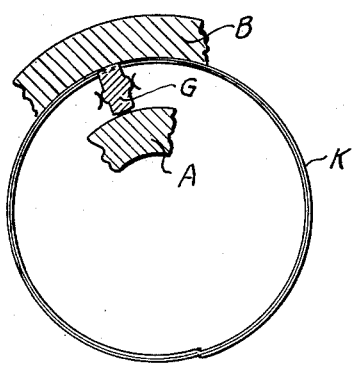
Fig. 5 is an elevation of the coil spring shown in Fig. 4.
Figure 4:
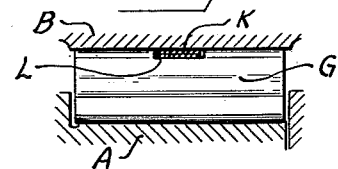
Fig. 4 is a view similar to a portion of Fig. 2 showing a modified construction.

In the modified construction shown in Fig. 4 and Fig. 5, a spiral spring K is wrapped about the series of sprags and located in an annular recess L centrally of said sprags. This spring exerts a slight radially inward stress on all of the sprags which assists in holding the same in operative position. Inasmuch as the whole annular space is filled with sprags, it is unnecessary to provide any other retainer therefor.

What I claim as my invention is:

1. In a one-way rotary clutch, coaxial relatively revoluble inner and outer members having spaced concentric surfaces, a series of sprag members substantially filling the space between said surfaces and end-contacting therewith when at a slight angle to radial lines, the whole series forming a circumferentially non-compressible annulus predeterminedly limiting the angular movement of each sprag, and resilient means encircling the series for imparting a turning moment to each individual sprag within the limits of its movement.

2. In a one-way rotary clutch, coaxial relatively revoluble inner and outer members having spaced concentric surfaces, a series of sprag members substantially filling the space between said surfaces and end-contacting therewith when at a slight angle to radial lines, the whole series forming a substantially non-compressible annulus predeterminedly limiting the angular movement of each sprag, and a spiral spring encircling the series and engaging notches in the individual sprags, said spring exerting a radially inwardly directed stress on each sprag to hold the same in contact with the inner member to produce an initial turning moment.

JOHAN LUND.